US012694075B2

(12) United States Patent
Schneider et al.

(10) Patent No.: US 12,694,075 B2
(45) Date of Patent: Jul. 28, 2026

(54) METHOD FOR FUSING ENVIRONMENT-RELATED PARAMETERS

(71) Applicant: Robert Bosch GmbH, Stuttgart (DE)

(72) Inventors: Peter Schneider, Holzgerlingen (DE);
Stephan Reuter, Thalfingen (DE);
Thomas Gussner, Ludwigsburg (DE);
Andreas Heyl, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 684 days.

(21) Appl. No.: 18/044,841

(22) PCT Filed: Sep. 23, 2021

(86) PCT No.: PCT/EP2021/076204
§ 371 (c)(1),
(2) Date: Mar. 10, 2023

(87) PCT Pub. No.: WO2022/063900
PCT Pub. Date: Mar. 31, 2022

(65) Prior Publication Data
US 2023/0342434 A1 Oct. 26, 2023

(30) Foreign Application Priority Data

Sep. 23, 2020 (DE) ..................... 10 2020 211 890.6

(51) Int. Cl.
*G06F 18/25* (2023.01)
(52) U.S. Cl.
CPC .................................. *G06F 18/251* (2023.01)
(58) Field of Classification Search
CPC ........ G06V 20/56; G06V 10/80; G01S 17/86;
G01S 17/931; G06F 18/251
(Continued)

(56) References Cited

U.S. PATENT DOCUMENTS 9,855,894 B1 1/2018 Khorasani
10,762,440 B1 9/2020 Garg et al.
(Continued)

OTHER PUBLICATIONS

International Search Report corresponding to PCT Application No. PCT/EP2021/076204, mailed Dec. 6, 2021 (German and English language document) (6 pages).

*Primary Examiner* — John H Le
(74) *Attorney, Agent, or Firm* — Maginot, Moore & Beck LLP

(57) ABSTRACT

A method for fusing environment-related parameters includes providing at least one environment-related parameter of a first sensor system; providing at least one environment-related parameter of a second sensor system; providing at least one respective boundary condition that existed when the respective at least one environment-related parameter of the respective sensor system was determined; assigning the at least one respective boundary condition to the respective at least one environment-related parameter of the respective sensor system; providing an evaluation scheme which assigns weighting factors to the respective environment-related parameter of the respective sensor system depending on the respective boundary conditions; and fusing, with a fusion device, the at least one environment-related parameter of the first sensor system with the at least one environment-related parameter of the second sensor system according to the assigned weighting factors to determine the representation of the environment of the sensor systems.

17 Claims, 2 Drawing Sheets

(58) Field of Classification Search
USPC .......................................................... 702/3
See application file for complete search history.

(56) References Cited

U.S. PATENT DOCUMENTS

| | | | | |
|---|---|---|---|---|
| 10,852,420 B2 * | 12/2020 | Chondro | ............... | G01S 13/867 |
| 11,145,146 B2 * | 10/2021 | Mercep | ............. | B60W 50/0225 |
| 2019/0050692 A1 | 2/2019 | Sharma et al. | | |

* cited by examiner

METHOD FOR FUSING ENVIRONMENT-RELATED PARAMETERS

This application is a 35 U.S.C. § 371 National Stage Application of PCT/EP2021/076204, filed on Sep. 23, 2021, which claims the benefit of priority to Serial No. DE 10 2020 211 890.6, filed on Sep. 23, 2020 in Germany, the disclosures of which are incorporated herein by reference in their entirety.

BACKGROUND

The automation of driving goes hand in hand with equipping vehicles with ever more extensive and powerful sensor systems for environmental sensing. To some extent, vehicle sensors redundantly cover 360° of the environment and different ranges using a plurality of sensors and sensor modalities. Sensor modalities include video, radar, LiDAR, ultrasonic and microphone sensors, for example.

Sensor data is fused into a secured environment model to represent an environment of the vehicle. Requirements for the scope and quality of the environment model then depend on the driving functions implemented upon said model. In a driverless vehicle, for example, comprehensive driving decisions are made on the basis of the environment model and the actuators are controlled accordingly.

Standards relating to at least partially automated driving, such as the ISO/PAS 21448 standard (Road vehicles—Safety of the Intended Functionality (SOTIF)), show that integrity is not the only critical factor for the usability of sensor signals in safety-related functions. Rather, the performance and/or the capabilities and inadequacies of the sensor, with respect to individual measurement functions, must be taken into account in the safety concept or in the signal fusion. Critical errors to be taken into account in this context can relate to incorrect measurements, false positives (FP) and/or false negatives (FN), for example.

SUMMARY

To represent an environment of a vehicle, data from sensor systems is processed in a variety of steps, wherein the data is further abstracted with each processing step and ultimately merged or fused into a secured environment model. The common algorithms for different sensor modalities for object detection, object classification, object tracking, distance calculation, etc., are susceptible to input data that is not correct, in particular due to external conditions or boundary conditions under which they were determined. Typical methods for object detection and object classification can fail in these cases due to false positive and false negative determinations of environment-related parameters, without recognizing their correspondingly degraded state.

According to aspects of the disclosure, a method for fusing environment-related parameters, a method for providing a control signal, a use of the method, a fusion device, a computer program and a machine-readable storage medium are proposed. Advantageous configurations are the subject matter of the following description.

Throughout this description of the disclosure, the sequence of method steps is presented in such a way that the method is easy to follow. However, those skilled in the art will recognize that many of the method steps can also be carried out in a different order and lead to the same or a corresponding result. In this respect, the order of the method steps can be changed accordingly. Some features are numbered to improve readability or to make the assignment more clear, but this does not imply a presence of specific features.

According to one aspect of the disclosure, a method for fusing environment-related parameters which were each determined using data from different sensor systems to determine a representation of an environment of the sensor systems is proposed, wherein the method comprises the following steps:

In one step, at least one environment-related parameter of a first sensor system is provided. In a further step, at least one environment-related parameter of a second sensor system is provided. In a further step, at least one respective boundary condition that existed when the respective at least one environment-related parameter of the respective sensor system was determined is provided. In a further step, the at least one respective boundary condition is assigned to the respective at least one environment-related parameter of the respective sensor system. In a further step, an evaluation scheme is provided, which assigns weighting factors to the respective environment-related parameter of the respective sensor system depending on the respective boundary conditions when the respective environment-related parameter was determined. In a further step, the at least one environment-related parameter of the first sensor system is fused with the at least one environment-related parameter of the second sensor system according to the assigned weighting factors to determine the representation of the environment.

The weighting factor can be proportional to a probability that an environment-related parameter is measured correctly under specific given boundary conditions, such as weather conditions, in a specific spatial range sensed by the respective sensor. Such a weighting factor can be multidimensional with respect to the boundary conditions and the environment-related parameters.

An environment-related parameter of a sensor system is a parameter that relates to an environment of the sensor system and is determined using data from a sensor system or from a plurality of sensor systems.

An environment-related parameter can be a variable that evaluates and/or aggregates using data from a sensor system with respect to a measurement target to represent an environment of the sensor system.

A segmentation of an image or a stixel or an L-shape of a LiDAR system is evaluated with respect to the measurement target "object detection", for instance; for example to identify and measure an object class "car" and determine its position.

The environment-related parameter can be more highly abstracted than the pure data of the sensor system. The environment-related parameter can, for example, include objects, features, stixels, dimensions of respective specific objects, types of objects, three-dimensional "bounding boxes", classes of objects, L-shapes and/or edges and/or reflection points, for instance of LiDAR systems.

In other words, providing the evaluation scheme makes it possible to provide explicit knowledge of the capabilities and inadequacies of data sources, sensors or sensor modalities in a structured and easy-to-use format and for use in fusing environment-related parameters, for example for the operation of an at least partially automated platform, using a representation of an environment of the platform and/or the sensor systems of the platform.

Using the evaluation scheme for fusing environment-related parameters makes it possible to improve the robustness of said fusion against incorrect measurements and inadequate preprocessing algorithms and models used in the sensor path, because known inadequacies can be detected and mitigated in a targeted manner. Known capabilities of sensors can in turn be leveraged to make optimal use of them in the fusion and to generate and confirm hypotheses more quickly. Overall, this enables a technical safety argumentation for such systems and methods with respect to SOTIF (Safety of the Intended Functionality).

A result of a fusion of environment-related parameters according to this method can be used in terms of a "functional inadequacy" or "performance limitation" according to ISO 21448 in the overall safety concept by comparing the respective weighting factors with respective corresponding threshold values in order to provide safe functionality by means of the method.

According to one aspect, it is proposed that the at least one boundary condition includes a sensor-specific boundary condition and/or an environment-related boundary condition and/or an object-related boundary condition.

The respective boundary conditions relevant for the respective sensor system when determining environment-related parameters result from the explicit knowledge of the capabilities and inadequacies of data sources, sensors or sensor modalities, such as expert knowledge, that is mapped in the evaluation scheme.

An example of a sensor-specific boundary condition can relate to light conditions, for example for an optical sensor system, such as a camera or video system, wherein, depending on the time of day, the sensor system is blinded by a corresponding incidence of light, for example a low-lying sun, and a determination of an environment-related parameter is consequently impaired, so that this dependency can be taking into account using the evaluation scheme. Another sensor-specific boundary condition can relate to a temperature of a sensor system, wherein the sensor system can carry out the determination of an environment-related parameter with varying degrees of accuracy depending on the temperature.

An example of an environment-related boundary condition can relate to traffic density, for example if a sensor system is impaired in terms of the quality of the determination of an environment-related parameter by other sensor systems and/or ADAS/AD systems and/or a complexity of the determination or an interpretation of the determination by a large number of objects and/or overlapping objects and/or a proximity to a disruptive radar radiation source, e.g. near an airport or military area.

According to one aspect, it is proposed that the sensor-specific boundary condition relates to spatial coordinates of the environment-related parameter determined by the respective sensor system.

Since sensor systems can detect and/or determine environment-related parameters within their spatial detection range with varying degrees of accuracy, this aspect of the quality of the determination of an environment-related parameter can be incorporated into the weighting using the evaluation scheme if the corresponding boundary condition for determining the respective environment-related parameter can be provided or determined.

Such a sensor-specific boundary condition can relate to angular ranges and/or range regions or distances in the spatial detection range relative to the respective sensor system, for example. This can in particular relate to a quality of the determination of an environment-related parameter at the edge of the detection range of a sensor system, which can be taken into account in the fusion via the evaluation scheme and the respective boundary condition by means of the corresponding weighting factors.

For a LiDAR sensor, for instance, a problem when determining an object can always occur in a "bottom right" angular range or beyond a specific distance, which, in the evaluation scheme with the respective boundary condition, can lead to a correspondingly lower weighting of the environment-related parameter of the LiDAR sensor system when fusing environment-related parameters.

Alternatively or additionally, the detection range of a sensor system can be mapped in polar coordinates as concentric three-dimensional spherical segments around the sensor and/or in Cartesian coordinates as a three-dimensional grid around the sensor system or around the vehicle. A multidimensional weighting factor can be assigned to each grid cell.

According to one aspect, it is proposed that the sensor-specific boundary condition relates to a modality of the respective sensor system that generated the environment-related parameter.

This makes it possible to show that sensor systems of a certain modality can determine objects, for example, as an environment-related parameter with varying degrees of precision depending on the speed of the respective objects.

According to one aspect, it is proposed that the environment-related boundary condition includes a weather-related boundary condition and/or a boundary condition related to a surface of the environment.

Weather-related boundary conditions, such as fog and/or rain and/or snow, that prevail when environment-related parameters are determined can directly affect a quality of the determination and/or implicitly affect the quality of the determination by partially or completely obscuring the sensor system. An optical image can be degraded by semi-transparent rain drops, for example.

Examples of boundary conditions related to the surface of the environment can involve properties of the road, such as a topography, a topology, a surface condition of a base surface, potholes in the roadway or a reflectivity of a base surface in wet conditions.

Boundary conditions relating to surfaces of objects in the environment can also include reflections on buildings, storefronts or office windows, for example, or reflections on buses or radar reflections in tunnels or guardrails.

Boundary conditions related to the surface of the environment can moreover include a type of objects to be detected with respect to a material or a texture.

According to one aspect, it is proposed that the evaluation scheme is generated by expert knowledge and/or by means of a neural network.

The knowledge can be provided in the system by means of a heuristic database, but also by means of a trained neural network.

In other words, the evaluation scheme can use expert knowledge to define a weighting of the environment-related parameters at the respective boundary condition for a respective sensor system. Alternatively or additionally, such an evaluation scheme can be generated on the basis of heuristics. Alternatively or additionally, the evaluation scheme can include an assignment of weights to the respective environment-related parameter of a respective sensor system at a defined boundary condition on the basis of a correspondingly trained neural network.

The evaluation scheme can provide explicit knowledge about the respective sensor systems; for example relating to a probability that an environment-related parameter will be measured correctly at specific boundary conditions, such as weather conditions, in a specific spatial range of the sensor system.

The explicit knowledge can also relate to a probability that an environment-related parameter will be measured incorrectly or not at all at specific given boundary conditions in a specific spatial range of the sensor system, i.e. also depict false positive and/or false negative determinations. The explicit knowledge can furthermore relate to a probability that an environment-related parameter will similarly be measured incorrectly or not at all at specific given boundary conditions by two different sensor modalities or two different, sensor systems of the same type.

The explicit knowledge can moreover relate to known interference effects, such as glare and/or reflection depending on the environment with respect to a detectability or a detection probability of an environment-related parameter at specific given boundary conditions in specific spatial ranges of the sensor system.

According to one aspect, it is proposed that the evaluation scheme assigns weighting factors to environment-related parameters of the respective sensor system and/or environment-related parameters from map systems and/or environment-related parameters from infrastructure systems depending on the respective boundary conditions.

Such an extended evaluation scheme makes it possible, in addition to environment-related parameters generated by sensor systems, also take environment-related parameters from map systems, such as topographical maps or high-resolution maps, and environment-related parameters from infrastructure systems into account in the fusion for determining a representation of the environment.

The corresponding weighting factors for environment-related parameters from sensor systems can be determined by means of modeling and/or a model analysis with explicit consideration of different external conditions and/or an evaluation or validation in a simulation or in the real (target) environment and/or an evaluation or validation of a set of sensor systems.

Weighting factors for environment-related parameters can correspondingly be determined from map systems using analytical methods and/or validation and/or by crowdsourcing.

Weighting factors for environment-related parameters from infrastructure systems, such as guidance systems and/or road-side monitoring units (roadside unit) and/or vehicle to X systems (C2X: Car-to-X), can be determined by validation and/or certification.

According to one aspect, it is proposed that the boundary condition of the specific environment-related parameter of the first sensor system is provided by the first sensor system and/or the second sensor system and/or an external data source.

The provided boundary condition includes a weather condition and/or a position of an object to which the environment-related parameter relates and/or at least one object of the environment and/or a speed of an object to which the environment-related parameter relates and/or lighting conditions in the environment of the first sensor system.

In other words, relevant boundary conditions that lead to a change in the quality of the environment-related parameter of the respective sensor system must be provided for the assignment of weighting factors in the fusion of the respective environment-related parameters using the evaluation scheme. The boundary conditions can be provided by a sensor system of the same modality or preferably by a redundant source of information, such as a sensor system of a different modality.

The environment-related parameters of a rain sensor can be provided by means of weather data from a cloud, for instance, or by means of information from an infrastructure system.

The boundary conditions do not necessarily have to be determined directly; indicators for the existence of boundary conditions, such as typical reflection patterns of LiDAR sensor systems and radar sensor systems or key performance indicators (KPIs) for computer vision or machine learning, can alternatively or additionally be used as well.

According to one aspect, it is proposed that the weighting factor includes a standard weight for the respective sensor system and/or a model weight for the respective sensor system and/or a scene-specific weight.

A sensor system can in principle be assigned a standard weight for determining an environment-related parameter for the respective boundary condition according to its modality, which makes it possible to take sensor systems having different modality into account in the fusion with respect to an accuracy associated with the modality.

A model weight in particular depicts explicit knowledge about a respective sensor system for determining a specific environment-related parameter under a specific boundary condition. Such explicit knowledge can be expert knowledge and/or heuristically determined knowledge and/or knowledge determined by means of a trained neural network.

A scene-specific weight evaluates the determination of an environment-related parameter depending on a scene of the environment in which the environment-related parameter was determined by the respective sensor system. Examples include a speed of an object, or a size of an object, to which the environment-related parameter relates in relation to the size or number of objects surrounding this object.

If, for instance, a third sensor system fails to detect or determine an object of a scene, this method ensures that this error will not cause a probability that this object exists to be reduced by the result of the third sensor in the fusion when, under the boundary conditions for determining the object with the third sensor, the evaluation scheme enters this result into the fusion with a small weighting factor. A standard weight corresponding to a modality of the third sensor can be decreased for the weighting factor by a model weight resulting from the corresponding boundary condition.

Such an adjustment of the weighting factor to the boundary condition for the respective sensor system can be accomplished by replacing the standard weight with the model weight and/or multiplying the standard weight by the model weight and/or by other suitable mathematical methods, such as averaging and/or creating a median of the weights.

According to one aspect, it is proposed that the at least one environment-related parameter of the first sensor system is fused with the at least one environment-related parameter of the second sensor system by weighting the respective environment-related parameter with the respective weighting factor resulting from the respective boundary conditions according to the evaluation scheme in the fusion.

In other words, the weighting with the weighting factor in the fusion relates to a probability of existence of an object, for example, and/or to other environment-related parameters, such as a color and/or a position and/or a speed, in accordance with the respective boundary condition. Via this weighting, expert knowledge about sensor system capabilities and sensor system inadequacies, for example, is used for the fusion of the environment-related parameters.

Utilizing the provided evaluation scheme, a fusion system for fusing environment-related parameters can use the information of the evaluation scheme to weight the data from different sensor systems. If, for example, a sensor system cannot detect objects or can detect objects only poorly under the given boundary conditions according to the evaluation scheme, then this non-detection of an object by this sensor system does not cause the object hypothesis established by another sensor system, corresponding to a detection of this object by said other sensor system, to be reduced in its probability.

This is achieved by reducing a standard weight for determining the environment-related parameter with this sensor system according to a model weight.

This advantageously achieves that a one out of three hypothesis (1oo3) is maintained even if two sensor systems are known to simultaneously have poor detection capabilities under a specific boundary condition, but the third sensor system is able to detect objects very reliably.

The respective environment-related parameter being weighted with the respective weighting factor resulting from the respective boundary conditions according to the evaluation scheme in the fusion means, in other words, that the respective environment-related parameters of the respective sensor systems are fused such that, with respect to the fusion of the respective environment-related parameters, the parameter having a higher weighting factor is more strongly involved in a fusion result of the fusion of the respective environment-related parameters.

Alternatively or additionally, weightings of the evaluation scheme can also be determined by an expert system itself, e.g. on the basis of heuristics or on the basis of a trained neural network that determines the weightings for the fusion.

A method is proposed which, based on a representation of the environment determined using one of the above-described methods, provides a control signal for controlling an at least partially automated vehicle and/or, based on the determined representation of the environment, provides a warning signal for warning a vehicle occupant.

With respect to the feature that a control signal is provided based on a representation of the environment, the term "based on" is to be understood broadly. It is to be understood such that the representation of the environment is used for every determination or calculation of a control signal, wherein this does not exclude that other input variables are used for this determination of the control signal as well. The same applies correspondingly to the provision of a warning signal.

Highly automated systems can, for example, use such a control signal to initiate a transition to a safe state, for example by slow stopping in an emergency lane in an at least partially automated vehicle.

A fusion device is proposed, which is configured to carry out one of the above-described methods for fusing environment-related parameters.

A use of one of the above-described methods for fusing environment-related parameters of different and/or similar sensor systems is proposed.

According to one aspect, a computer program is specified which comprises instructions that, when the computer program is executed by a computer, prompt said computer program to carry out one of the above-described methods. Such a computer program enables the described method to be used in different systems.

A machine-readable storage medium is specified, on which the above-described computer program is stored. Such a machine-readable storage medium makes the above-described computer program portable.

BRIEF DESCRIPTION OF THE DRAWINGS

Embodiment examples of the disclosure are shown with reference to FIGS. 1 to 3 and will be explained in more detail in the following. Here.

DETAILED DESCRIPTION

Figure 1:
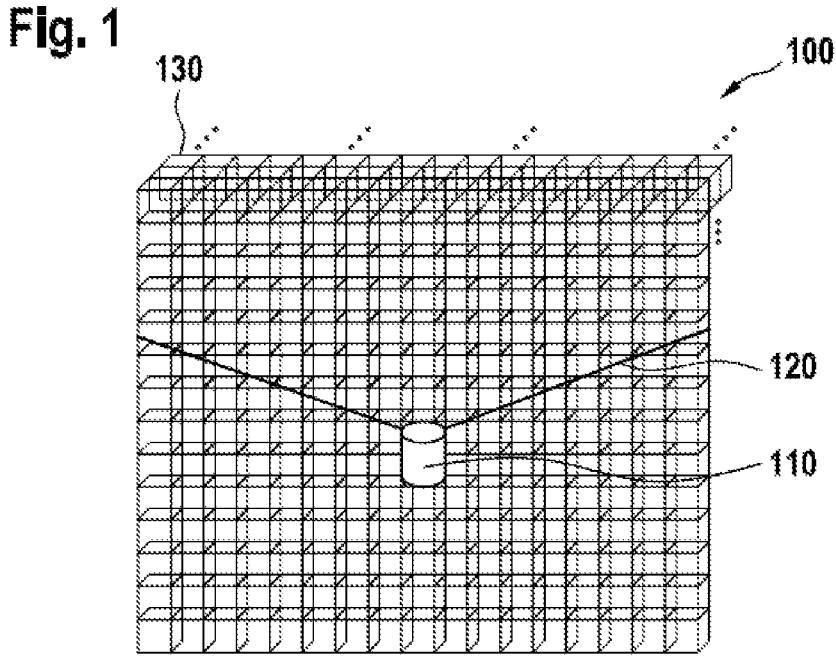
FIG. 1 shows an example of a format for an evaluation scheme structured by means of spatial elements around a sensor system.

FIG. 1 schematically outlines an evaluation scheme 100, in which the grid cells 130 with which the environment of a sensor system 110 is structured are respectively assigned a probability of detecting a false positive (FP) or a true positive determination or a false negative (FN) or a true negative determination of a defined environment-related parameter with a respective boundary condition. The lines 120 extending from the sensor system 110 outline a viewing angle of the sensor system 110.

This structure with the grid cells 130 allows weighting factors to easily be mapped as a function of spatial coordinates of the respective sensor system with respect to sensor-specific boundary conditions.

Such an assignment can be structured with a two-dimensional matrix, for example:

| P_D1  | P_D1\|x  | P_D1\|y  | P_D1\|z  | — |
|-------|----------|----------|----------|---|
| P_D2  | P_D2\|x  | P_D2\|y  | P_D2\|z  | — |
| P_FP1 | P_FP1\|x | P_FP1\|y | P_FP1\|z | — |
| P_FP2 | P_FP2\|x | P_FP2\|y | P_FP2\|z |   |
| P_FN1 | P_FN1\|x | P_FN1\|y | P_FN1\|z |   |
| —     |          |          |          |   |

Probabilities of detecting an FP or an FN are indicated in the rows, and the respective different boundary conditions are indicated in the columns. These probabilities correspond accordingly to the weighting factors of the evaluation scheme.

Figure 2:
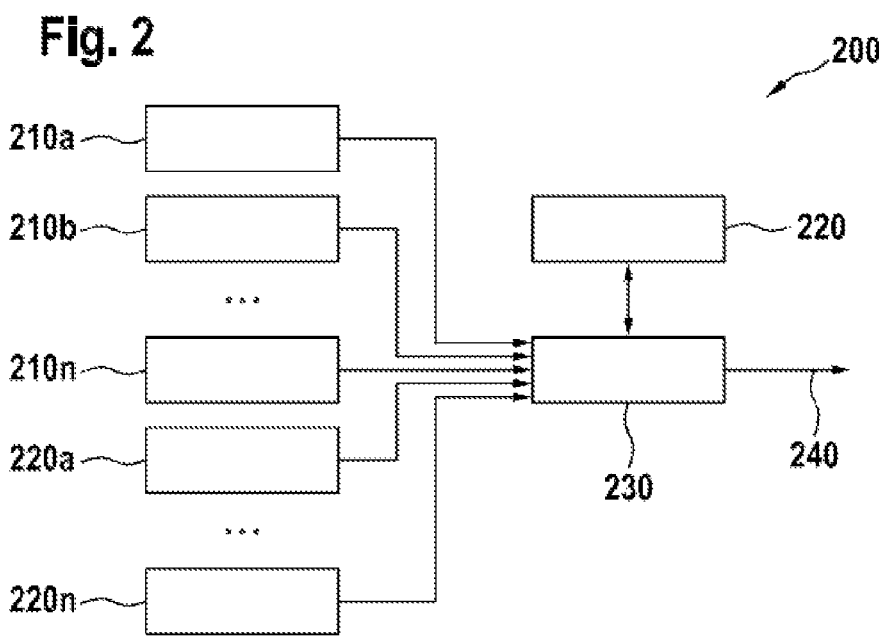
FIG. 2 shows a sketch of a data flow for a fusion of environment-related parameters of different sensor systems and data sources.

FIG. 2 schematically outlines a data flow 200 for fusing environment-related parameters of different sensor systems 210a to 210n and different data sources 220a to 220n. The data streams with raw data and/or environment-related parameters of the respective sensor systems 210a to 210n are fused using a fusion device 230, wherein an evaluation scheme 220 is provided to assign weighting factors to the respective environment-related parameters of the respective sensor systems depending on the boundary condition for the fusion to determine a representation of the environment 240.

Figure 3:
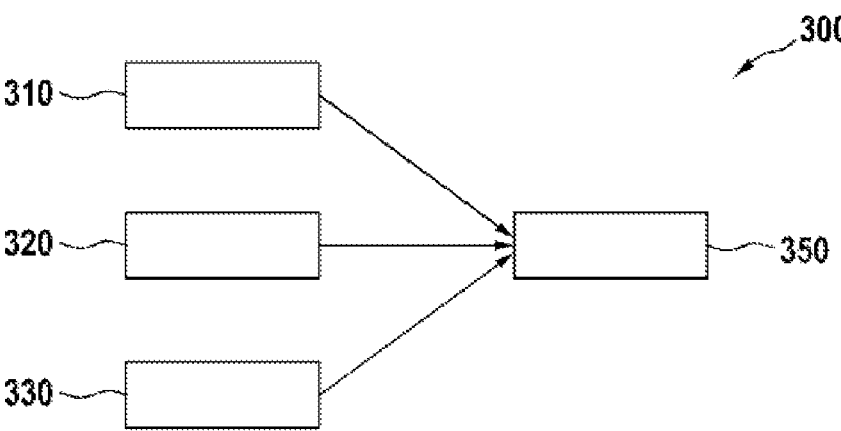
FIG. 3 shows a sketch of a data flow for creating a weighting factor.

FIG. 3 schematically outlines a data flow for creating the weighting factor using a standard weight 310 for the respective sensor system and/or a model weight 320 and/or a scene-specific weight 330.

The invention claimed is:

1. A method for fusing environment-related parameters which were each determined using data from different sensor systems to determine a representation of an environment of the sensor systems, the method comprising:

providing at least one environment-related parameter of a first sensor system;

providing at least one environment-related parameter of a second sensor system;

providing at least one respective boundary condition that existed when the respective at least one environment-related parameter of the respective first or second sensor system was determined;

assigning the at least one respective boundary condition to the respective at least one environment-related parameter of the respective first or second sensor system;

providing an evaluation scheme which assigns weighting factors to the respective at least one environment-related parameter of the respective first or second sensor system depending on the at least one respective boundary condition when the respective environment-related parameter was determined; and fusing the at least one environment-related parameter of the first sensor system with the at least one environment-related parameter of the second sensor system according to the assigned weighting factors to determine the representation of the environment of the sensor systems, wherein an at least partially automated vehicle is configured to navigate the environment of the sensor systems based on a control signal corresponding to the representation of the environment of the sensor systems, and wherein the at least one boundary condition for the first sensor system is provided by a third sensor system having a different modality from modalities of the first and second sensor systems.

2. The method according to claim 1, wherein the at least one boundary condition includes at least one of a sensor-specific boundary condition, an environment-related boundary condition, and an object-related boundary condition.

3. The method according to claim 2, wherein the sensor-specific boundary condition relates to spatial coordinates of the at least one environment-related parameter of the respective first or second sensor system.

4. The method according to claim 2, wherein the sensor-specific boundary condition relates to a modality of the respective first or second sensor system that generated the at least one environment-related parameter.

5. The method according to claim 2, wherein the environment-related boundary condition includes at least one of a weather-related boundary condition and a boundary condition related to a surface of the environment.

6. The method according to claim 1, wherein the evaluation scheme is generated by at least one of expert knowledge and a neural network.

7. The method according to claim 1, wherein the boundary condition of the determined environment-related parameter of the first sensor system is provided by the first sensor system and/or the second sensor system and/or an external data source, and the provided boundary condition includes: a weather condition and/or a position of an object to which the environment-related parameter relates and/or at least one object of the environment and/or a speed of an object to which the environment-related parameter relates and/or lighting conditions in the environment of the first sensor system.

8. The method according to claim 1, wherein the weighting factors include at least one of a standard weight for the respective first or second sensor system, a model weight for the respective first or second sensor system, and a scene-specific weight.

9. The method according to claim 1, wherein the fusing of the at least one environment-related parameter of the first sensor system with the at least one environment-related parameter of the second sensor system includes weighting the respective environment-related parameter with the respective weighting factor resulting from the respective boundary conditions according to the evaluation scheme.

10. The method according to claim 1, further comprising:

based on the determined representation of the environment, providing a warning signal for warning an occupant of the at least partially automated vehicle.

11. A fusion device configured to carry out the method according to claim 1.

12. Use of the method according to claim 1 for fusing environment-related parameters of different and/or similar sensor systems.

13. A computer program comprising instructions that, when the computer program is executed by a computer, prompt said computer to carry out the method according to claim 1.

14. A non-transitory machine-readable storage medium on which the computer program according to claim 13 is stored.

15. The method according to claim 1, wherein the at least one boundary condition is a temperature of the first sensor system as determined by the third sensor system.

16. The method according to claim 1, wherein the at least one boundary condition is a traffic density as determined by the third sensor system.

17. The method according to claim 1, wherein:

the first, second, and third sensor systems are included on a vehicle, and the at least one boundary condition is a surface condition of a road on which the vehicle is currently located as determined by the third sensor system.

* * * * *